US011983327B2

(12) United States Patent
Topoleanu et al.

(10) Patent No.: US 11,983,327 B2
(45) Date of Patent: May 14, 2024

(54) METHOD FOR IDENTIFYING A GESTURE (71) Applicant: FotoNation Limited, Galway (IE)

(72) Inventors: Tudor Topoleanu, Brasov (RO); Szabolcs Fulop, Brasov (RO); Petronel Bigioi, Galway (IE); Cian Ryan, Galway (IE); Joseph Lemley, Galway (IE)

(73) Assignee: FotoNation Limited (IE)

( * ) Notice: Subject to any disclaimer, the term of this patent is extended or adjusted under 35 U.S.C. 154(b) by 213 days.

(21) Appl. No.: 17/495,337

(22) Filed: Oct. 6, 2021

(65) Prior Publication Data
US 2023/0107097 A1 Apr. 6, 2023

(51) Int. Cl.
*G06F 3/01* (2006.01)
*G06F 18/2431* (2023.01)
*G06V 10/25* (2022.01)
*G06V 20/59* (2022.01)
*G06V 40/10* (2022.01)
*G06V 40/20* (2022.01)

(52) U.S. Cl.
CPC .......... *G06F 3/017* (2013.01); *G06F 18/2431* (2023.01); *G06V 10/25* (2022.01); *G06V 20/593* (2022.01); *G06V 40/107* (2022.01); *G06V 40/28* (2022.01)

(58) Field of Classification Search
CPC .... G06V 40/28; G06V 20/593; G06V 40/107; G06V 10/25; G06F 18/2431; G06F 3/017; G06F 3/0488; G06N 20/00; H04N 1/00381; H04W 12/68; G05B 2219/36418
See application file for complete search history.

(56) References Cited

U.S. PATENT DOCUMENTS

| 7,030,861 B1* | 4/2006 | Westerman ......... G06F 3/04883 345/173 |
| 9,207,760 B1* | 12/2015 | Wu ..................... G06F 18/2113 |
| 10,088,924 B1* | 10/2018 | Ivanchenko ........... G06F 3/041 |

(Continued)

FOREIGN PATENT DOCUMENTS

| CA | 3043972 A1 * | 6/2018 | ............. C23C 14/06 |
| CA | 3084546 A1 * | 6/2019 | ............. A61B 3/113 |

(Continued)

OTHER PUBLICATIONS

C. Feichtenhofer, A. Pinz, and R. Wildes, "Spatiotemporal residual networks for video action recognition", In Advances In Neural Information Processing Systems, pp. 3468-3476, 2016.

(Continued)

*Primary Examiner* — Steven P Sax
(74) *Attorney, Agent, or Firm* — Lerner David LLP (57) ABSTRACT

A method for identifying a gesture from one of a plurality of dynamic gestures, each dynamic gesture comprising a distinct movement made by a user over a period of time within a field of view of an image acquisition device comprises iteratively: acquiring a current image from said image acquisition device at a given time; and passing at least a portion of the current image through a bidirectionally recurrent multi-layer classifier. A final layer of the multi-layer classifier comprises an output indicating a probability that a gesture from the plurality of dynamic gestures is being made by a user during the time of acquiring the image.

20 Claims, 6 Drawing Sheets

(56) References Cited

U.S. PATENT DOCUMENTS

| | | | | |
|---|---|---|---|---|
| 10,434,935 | B1* | 10/2019 | Zhang | G08G 1/096758 |
| 10,839,203 | B1* | 11/2020 | Guigues | G06V 10/774 |
| 2015/0015710 | A1* | 1/2015 | Tiryaki | B60R 11/04 |
| | | | | 348/148 |
| 2017/0206405 | A1* | 7/2017 | Molchanov | G06N 3/044 |
| 2017/0279957 | A1* | 9/2017 | Abramson et al. | G06F 21/36 |
| 2018/0293739 | A1* | 10/2018 | Gupta | G06V 10/62 |
| 2018/0330729 | A1* | 11/2018 | Golipour | G10L 15/26 |
| 2019/0155313 | A1* | 5/2019 | Tang | B64C 39/024 |
| 2020/0143560 | A1* | 5/2020 | Lu | G06T 7/73 |
| 2020/0201444 | A1* | 6/2020 | Stoyles | G06F 3/1423 |
| 2021/0224474 | A1* | 7/2021 | Bellegarda | G06F 40/30 |
| 2021/0350346 | A1* | 11/2021 | Edwards | G06Q 20/1085 |
| 2022/0198180 | A1* | 6/2022 | Weaver | G06F 3/017 |

FOREIGN PATENT DOCUMENTS

| | | | | |
|---|---|---|---|---|
| CA | 3028791 | A1 * | 7/2019 | G01J 1/0488 |
| CA | 2995242 | A1 * | 8/2019 | G06K 9/00208 |
| CA | 3174030 | A1 * | 12/2021 | H04B 17/318 |
| CA | 3051912 | C * | 3/2023 | G06F 21/32 |
| CN | 104182772 | A * | 12/2014 | |
| CN | 106372564 | A * | 2/2017 | |
| CN | 106803062 | A * | 6/2017 | |
| CN | 107180226 | A * | 9/2017 | |
| CN | 107590432 | A * | 1/2018 | |
| CN | 107967458 | A * | 4/2018 | |
| CN | 108334814 | A * | 7/2018 | G06K 9/00355 |
| CN | 109740534 | A * | 5/2019 | |
| CN | 111027526 | A * | 4/2020 | |
| CN | 111191627 | A * | 5/2020 | G06K 9/00355 |
| CN | 111209861 | A * | 5/2020 | G06K 9/00355 |
| CN | 111444771 | A * | 7/2020 | G06K 9/00355 |
| CN | 111695507 | A * | 9/2020 | G06F 16/51 |
| CN | 112270220 | A * | 1/2021 | G06K 9/00355 |
| CN | 113255602 | A * | 8/2021 | |
| CN | 113449573 | A * | 9/2021 | |
| CN | 108537147 | B * | 12/2021 | G06F 3/017 |
| JP | 2016038889 | A * | 3/2016 | G02B 27/0093 |
| JP | 2017531212 | A5 * | 9/2018 | |
| JP | 2023517383 | A * | 4/2023 | |
| JP | 2023518562 | A * | 5/2023 | |
| KR | 101526423 | B1 * | 6/2015 | |
| KR | 20200130870 | A * | 11/2020 | |
| KR | 20220165092 | A * | 12/2022 | |
| WO | WO-2018053357 | A1 * | 3/2018 | G06F 3/011 |
| WO | WO-2021086688 | A2 * | 5/2021 | G01S 13/06 |
| WO | WO-2021105279 | A1 * | 6/2021 | G06F 3/04883 |
| WO | WO2021254673 | A2 | 12/2021 | |

OTHER PUBLICATIONS

K. Simonyan and A. Zisserman, "Two-stream convolutional networks for action recognition in videos", in NIPS, 2014.

C. Feichtenhofer, A. Pinz, and A. Zisserman, "Convolutional two-stream network fusion for video action recognition", Computer Vision and Pattern Recognition (CVPR), 2016, arXiv preprint arXiv:1604.06573.

Xiaolong Wang, Ross Girshick, Abhinav Gupta and Kaiming He, "Non-local Neural Networks", CVPR, 2018, arXiv:1711.07971v3.

Shuyang Sun and Zhanghui Kuang and Wanli Ouyang and Lu Sheng and Wei Zhang, "Optical Flow Guided Feature: A Fast and Robust Motion Representation for Video Action Recognition", CVPR, 2018, arXiv:1711.11152v2.

N. Crasto, P. Weinzaepfel, K. Alahari and C. Schmid, "MARS: Motion-Augmented RGB Stream for Action Recognition," IEEE/CVF Conference on CVPR, 2019, pp. 7874-7883.

Xianyuan Wang, Zhenjiang Miao, Ruyi Zhang and Shanshan Hao, "I3D-LSTM: A New Model for Human Action Recognition", IOP Conference Series: Materials Science and Engineering, vol. 569, Issue 3.

Chih-Yao Ma, Min-Hung Chen, Zsolt Kira, Ghassan Al Regib, "TS-LSTM and temporal-inception: Exploiting spatiotemporal dynamics for activity recognition", Signal Processing: Image Communication, vol. 71, 2019, pp. 76-87, ISSN 0923-5965.

P. Molchanov, X. Yang, S. Gupta, K. Kim, S. Tyree and J. Kautz, "Online Detection and Classification of Dynamic Hand Gestures with Recurrent 3D Convolutional Neural Networks", IEEE Conference on CVPR, 2016, pp. 4207-4215.

Omar Alharbi, "A Deep Learning Approach Combining CNN and Bi-LSTM with SVM Classifier for Arabic Sentiment Analysis", International Journal of Advanced Computer Science and Applications (IJACSA), 12(6), 2021.

H. Bilen, B. Fernando, E. Gavves and A. Vedaldi, "Action Recognition with Dynamic Image Networks," in IEEE Transactions on Pattern Analysis and Machine Intelligence, vol. 40, No. 12, pp. 2799-2813, Dec. 1, 2018.

L. Tao, X. Wang and T. Yamasaki, "Motion Representation Using Residual Frames with 3D CNN". 2020 IEEE International Conference on Image Processing (ICIP), 2020, pp. 1786-1790.

Wang, Qinyi & Zhang, Yexin & Yuan, Junsong & Lu, Yilong, "Space-Time Event Clouds for Gesture Recognition: From RGB Cameras to Event Cameras", IEEE Winter Conference on Applications of Computer Vision (WACV), 2019, 01826-1835.

Maro Jean-Matthieu, Ieng Sio-Hoi, Benosman Ryan, "Event-Based Gesture Recognition With Dynamic Background Suppression Using Smartphone Computational Capabilities", Frontiers in Neuroscience, vol. 14, 2020.

A. Amir et al., "A Low Power, Fully Event-Based Gesture Recognition System," IEEE Conference on CVPR, 2017, pp. 7388-7397.

Tang, Hao; Liu, Hong; Xiao, Wei and Sebe, Nicu, "Fast and Robust Dynamic Hand Gesture Recognition via Key Frames Extraction and Feature Fusion", Neurocomputing, vol. 331, pag. 424-433, 2019, Elsevier, https://arxiv.org/abs/1901.04622v1.

Oktay, Ozan & Schlemper, Jo & Folgoc, Loic & Lee, Matthew & Heinrich, Mattias & Misawa, Kazunari & Mori, Kensaku & McDonagh, Steven & Hammerla, Nils & Kainz, Bernhard & Glocker, Ben & Rueckert, Daniel, "Attention U-Net: Learning Where to Look for the Pancreas", 2018.

Yunpeng Chen, Haoqi Fan, Bing Xu, Zhicheng Yan, Yannis Kalantidis, Marcus Rohrbach, Shuicheng Yan and Jiashi Feng, "Drop an Octave: Reducing Spatial Redundancy in Convolutional Neural Networks with Octave Convolution", 2019, https://arxiv.org/abs/1904.05049v3.

Zahidul Islam, Mohammad Rukonuzzaman, Raiyan Ahmed, Md. Hasanul Kabir, Moshiur Farazi, "Efficient Two-Stream Network for Violence Detection Using Separable Convolutional LSTM", https://arxiv.org/abs/2102.10590v3.

Jeff Donahue, Lisa Anne Hendricks, Marcus Rohrbach, Subhashini Venugopalan, Sergio Guadarrama, Kate Saenko and Trevor Darrell, "Long-term Recurrent Convolutional Networks for Visual Recognition and Description", https://arxiv.org/abs/1411.4389v4.

U.S. Appl. No. 17/364,749, filed Jun. 30, 2021 and entitled "Vehicle occupant monitoring system and method.".

In Mingxing Tan, Quoc V. Le, "EfficientNet: Rethinking Model Scaling for Convolutional Neural Networks", Proceedings of the 36 th International Conference on Machine Learning, Long Beach, California, PMLR 97, 2019.

International Application No. PCT/EP2021/066440 filed Jun. 17, 2021 entitled "Event Camera Hardware.".

European Patent Office, International Search Authority, International Search Report and Written Opinion of International Application No. PCT/EP2021/066440 filed Jun. 17, 2021 entitled "Event Camera Hardware." Search Report dated Sep. 24, 2021, 15 pages.

* cited by examiner

METHOD FOR IDENTIFYING A GESTURE

FIELD

The present invention relates to a method for identifying a gesture.

BACKGROUND

There is an increasing interest in being able to control devices in a hands-free manner. One modality being investigated for controlling devices, especially those equipped with a user facing camera, is gesture recognition where a user making one of a variety of different gestures is imaged by one or more cameras with a view to determining a command to be performed by the device, for example, controlling a function of a vehicle such as the in-vehicle information systems (IVIS). In many cases, these gestures are hand gestures, but it will be understood that gestures can also be made with other parts of the body including the head.

Examples of such camera-based gesture recognition include:
C. Feichtenhofer, A. Pinz, and R. Wildes, "Spatiotemporal residual networks for video action recognition", In Advances in Neural Information Processing Systems, pages 3468-3476, 2016;
K. Simonyan and A. Zisserman, "Two-stream convolutional networks for action recognition in videos", in NIPS, 2014;
C. Feichtenhofer, A. Pinz, and A. Zisserman, "Convolutional two-stream network fusion for video action recognition", Computer Vision and Pattern Recognition (CVPR), 2016, arXiv preprint arXiv:1604.06573;
Xiaolong Wang, Ross Girshick, Abhinav Gupta and Kaiming He, "Non-local Neural Networks", CVPR, 2018, arXiv:1711.07971v3;
Shuyang Sun and Zhanghui Kuang and Wanli Ouyang and Lu Sheng and Wei Zhang, "Optical Flow Guided Feature: A Fast and Robust Motion Representation for Video Action Recognition", CVPR, 2018, arXiv:1711.11152v2;
N. Crasto, P. Weinzaepfel, K. Alahari and C. Schmid, "MARS: Motion-Augmented RGB Stream for Action Recognition," IEEE/CVF Conference on CVPR, 2019, pp. 7874-7883;
Xianyuan Wang, Zhenjiang Miao, Ruyi Zhang and Shanshan Hao, "I3D-LSTM: A New Model for Human Action Recognition", IOP Conference Series: Materials Science and Engineering, Volume 569, Issue 3;
Chih-Yao Ma, Min-Hung Chen, Zsolt Kira, Ghassan Al Regib, "TS-LSTM and temporal-inception: Exploiting spatiotemporal dynamics for activity recognition", Signal Processing: Image Communication, Volume 71, 2019, Pages 76-87, ISSN 0923-5965; and
P. Molchanov, X. Yang, S. Gupta, K. Kim, S. Tyree and J. Kautz, "Online Detection and Classification of Dynamic Hand Gestures with Recurrent 3D Convolutional Neural Networks", IEEE Conference on CVPR, 2016, pp. 4207-4215.

The type of image provided to any network which attempts to recognise a gesture being made by a user within a field of view of a camera can comprise a stream of individual frames or in some cases difference frames, where data from a previously acquired image is subtracted from an instant image, such as disclosed in:
Omar Alharbi, "A Deep Learning Approach Combining CNN and Bi-LSTM with SVM Classifier for Arabic Sentiment Analysis", International Journal of Advanced Computer Science and Applications (IJACSA), 12(6), 2021;
H. Bilen, B. Fernando, E. Gavves and A. Vedaldi, "Action Recognition with Dynamic Image Networks," in IEEE Transactions on Pattern Analysis and Machine Intelligence, vol. 40, no. 12, pp. 2799-2813, 1 Dec. 2018; and
L. Tao, X. Wang and T. Yamasaki, "Motion Representation Using Residual Frames with 3D CNN". 2020 IEEE International Conference on Image Processing (ICIP), 2020, pp. 1786-1790.

It is also possible to employ an event camera, for example of the type described in PCT Application No. PCT/EP2021/058973 (Ref: FN-675-PCT), the disclosure of which is incorporated herein by reference, where event information is accumulated in a tensor before being provided to a classifier, as disclosed in:
Wang, Qinyi & Zhang, Yexin & Yuan, Junsong & Lu, Yilong, "Space-Time Event Clouds for Gesture Recognition: From RGB Cameras to Event Cameras", IEEE Winter Conference on Applications of Computer Vision (WACV), 2019, p 1826-1835;
Maro Jean-Matthieu, Ieng Sio-Hoi, Benosman Ryan, "Event-Based Gesture Recognition With Dynamic Background Suppression Using Smartphone Computational Capabilities", Frontiers in Neuroscience, vol 14, 2020; and
A. Amir et al., "A Low Power, Fully Event-Based Gesture Recognition System," IEEE Conference on CVPR, 2017, pp. 7388-7397.

Still further work in this field includes:
Tang, Hao; Liu, Hong; Xiao, Wei and Sebe, Nicu, "Fast and Robust Dynamic Hand Gesture Recognition via Key Frames Extraction and Feature Fusion", Neurocomputing, vol 331, pag. 424-433, 2019, Elsevier, https://arxiv.org/abs/1901.04622v1;
H. Bilen, B. Fernando, E. Gavves and A. Vedaldi, "Action Recognition with Dynamic Image Networks," in IEEE Transactions on Pattern Analysis and Machine Intelligence, vol. 40, no. 12, pp. 2799-2813, 1 Dec. 2018;
L. Tao, X. Wang and T. Yamasaki, "Motion Representation Using Residual Frames with 3D CNN," 2020 IEEE International Conference on Image Processing (ICIP), 2020, pp. 1786-1790;
Zahidul Islam, Mohammad Rukonuzzaman, Raiyan Ahmed, Md. Hasanul Kabir, Moshiur Farazi, "Efficient Two-Stream Network for Violence Detection Using Separable Convolutional LSTM", https://arxiv.oreabs/2102.10590v3; and
Jeff Donahue, Lisa Anne Hendricks, Marcus Rohrbach, Subhashini Venugopalan, Sergio Guadarrama, Kate Saenko and Trevor Darrell, "Long-term Recurrent Convolutional Networks for Visual Recognition and Description", https://arxiv.org/abs/1411.4389v4.

SUMMARY

According to the present invention, there is provided a method for identifying a gesture according to claim 1.

Embodiments provide classification of dynamic hand gestures, that is gestures which involve more than just an instantaneous appearance of a user, but also involve movement.

A gesture may be a hand gesture, but gestures may also or in the alternative comprise head or body gestures or any other form of gesture involving movement.

In some embodiments, a difference image, where an image acquired at a previous instant in time is subtracted from a presently acquired image, is employed as an input to a classification network.

In some embodiments, a difference type image can be obtained from an event camera as an input to a classification network.

In other implementations, hidden layer information from a previous instance of a classification network encoder can be provided to a given instance of classification network encoder.

Embodiments are suitable for controlling functions of a vehicle including for example, an in-vehicle information system (IVIS).

In some embodiments, for example, where a gesture is made by the user's hand or head, the method comprises detecting the location of the hand or head within the field of view of the camera and providing the location to the classification network.

Other embodiments operate on an image crop corresponding to a static region of interest (ROI) taken from images acquired by the user facing camera.

In further aspects, there are provided a gesture recognition system and a computer program product for implementing methods according to the invention.

BRIEF DESCRIPTION OF THE DRAWINGS

An embodiment of the invention will now be described, by way of example, with reference to the accompanying drawings, in which.

DESCRIPTION OF THE EMBODIMENT

Embodiments of the present invention will be described in terms of a system for identifying gestures made by an occupant of a vehicle cabin. It will be appreciated however that the invention is applicable to identifying gestures made by a user facing any camera.

Figure 1:
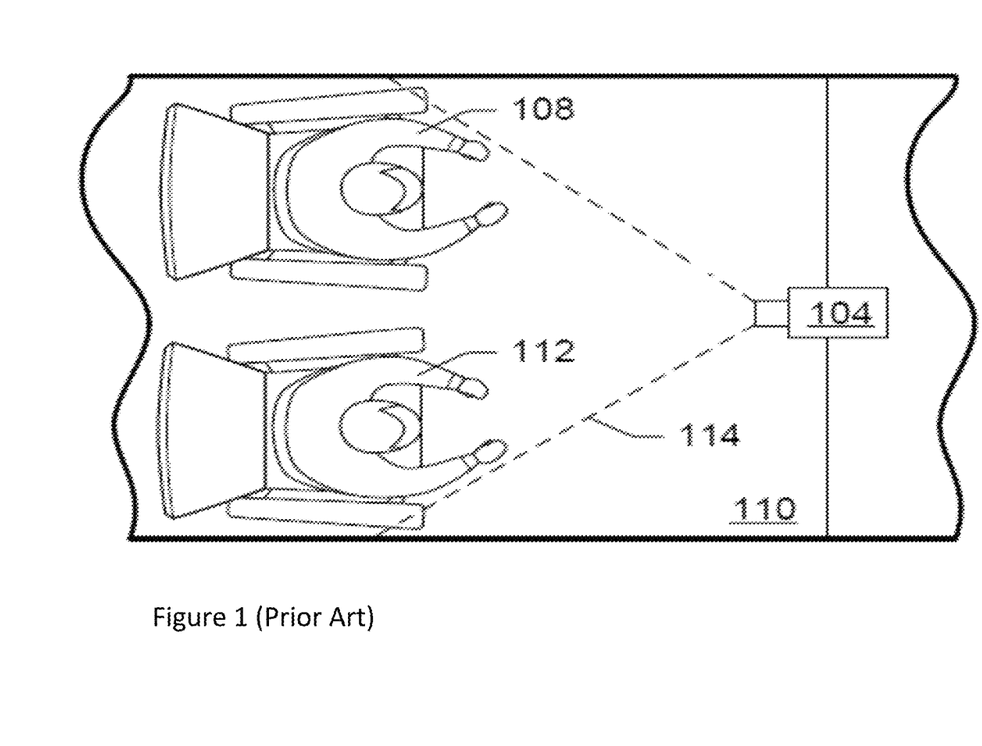
FIG. 1 shows schematically a cabin of a vehicle including a number of occupants as well as an image acquisition device suitable for a system for identifying a gesture according to an embodiment of the present invention.

Referring now to FIG. 1, vehicle occupant monitoring systems typically comprise an image acquisition device 104 mounted in a cabin 110 of a vehicle in which one or more occupants 108, 112 are seated within the field of view 114 of the camera. In FIG. 1, two occupants 108, 112 are shown in front seats of the vehicle, with the image acquisition device 104 located forwardly and facing rearwardly. It will be appreciated that other occupants of the vehicle including back seat passengers (not shown) may also appear within the field of view 114 of the camera 104.

The image acquisition device 104 can comprise any of: a visible wavelength color camera with RGB pixels, an infrared (IR) camera, a camera including a Bayer array of pixels including R, G, B and IR sensitive pixels or a thermal camera. Alternatively, the camera could comprise a monochrome, for example, green sensitive, camera. Typical useful frame rates when employing such frame-based cameras are in the region of 25 frames per second. In a still further alternative, the image acquisition device 104 could comprise an event camera of the type described in PCT Application No. PCT/EP2021/058973 (Ref: FN-675-PCT), the disclosure of which is incorporated herein by reference, where event information is accumulated in an image tensor before being provided to downstream classifiers. Again, the pixels of such a camera can be sensitive to any of visible, infra-red or thermal radiation. As disclosed in PCT/EP2021/066440 (Ref: FN-668-PCT), the disclosure of which is herein incorporated by reference, dedicated hardware can be provided to produce such an image tensor from event camera information. In a still further alternative, the image acquisition device 104 could comprise a combined frame based and event camera such as a Davis 346 camera available at iniVation.com.

It will also be appreciated that it is possible to swap between IR images and a visible wavelength image source in accordance with a measured ambient light level of the vehicle cabin.

Figure 2:
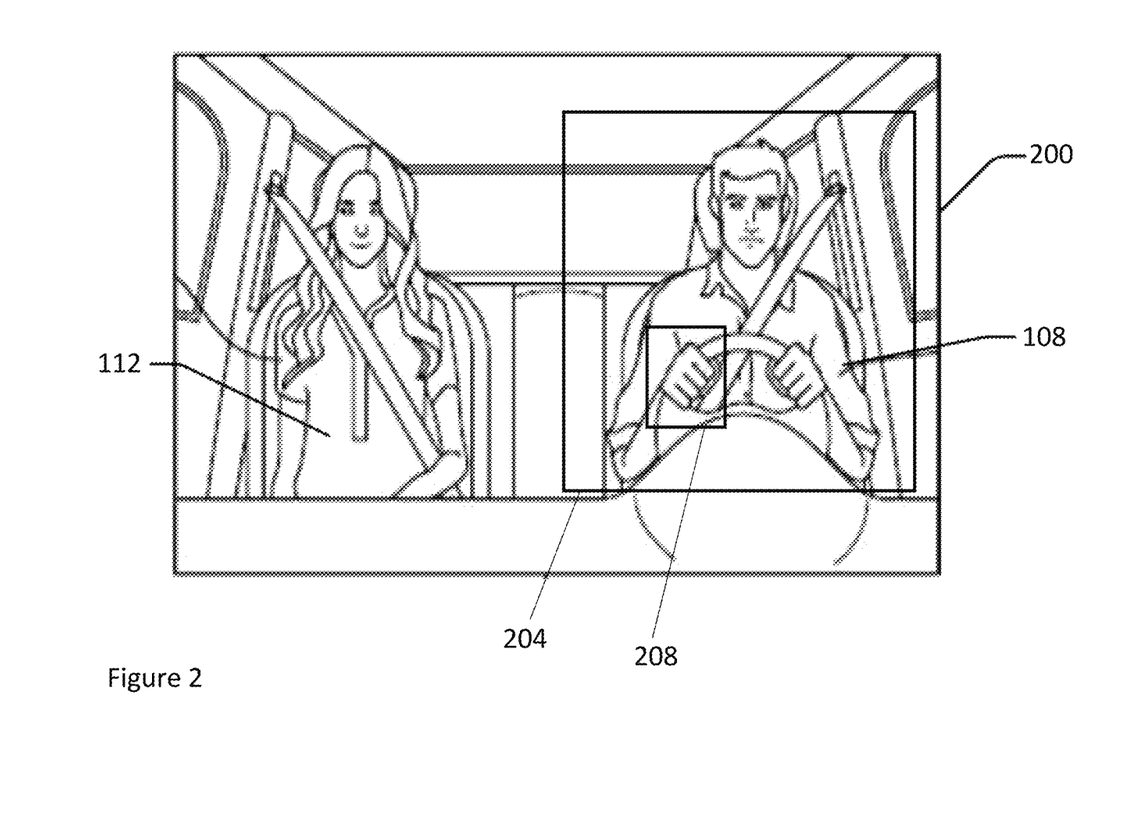
FIG. 2 illustrates an image crop and a hand region detected within the field of view of the image acquisition device of FIG. 1.

FIG. 2 shows a typical image 200 acquired by a frame-based image acquisition device 104 where it will be seen that occupant 108 is the driver of the vehicle, while occupant 112 is a passenger. In a typical implementation, a frame-based camera might have an image resolution greater than 1024×1024 pixels while an event camera might comprise a 1600×1300 array of pixels.

In embodiments of the invention, a ROI is selected around each subject whose gestures may be interpreted with a view to controlling a vehicle function for example, the IVIS. In the embodiment, the ROI corresponds to a 352×352 image crop centered around the body of a subject detected within the field of view of the device 104. In the example shown, the ROI 204 is centered around the driver 108 with a view to identifying gestures they may make, and it will be appreciated that a separate ROI could be defined around the passenger 112 if required. Note that while the ROI 204 is of interest for the present application, one or more other applications may also employ the images provided by the device 104 for example, for occupant monitoring as described in U.S. application Ser. No. 17/364,749 filed on 30 Jun. 2021 and entitled "Vehicle occupant monitoring system and method" (Ref: FN-676-US), the disclosure of which is incorporated herein by reference and each of these other applications may be concerned with other regions of interest within the field of view of the device 104.

The location of the ROI 204 within the image may be static or the location of the ROI may vary in accordance with the location of the occupant within the vehicle. In general, the location of the ROI within the field of view of the device 104 changes relatively infrequently or at most very slowly, as it is dynamic gestures within the frame of reference provided by the ROI which are of concern. As will be understood from the description below, the size of input image map provided to a downstream classifier is generally fixed and so the image crop corresponding to the ROI can either be upsampled or downsampled from a smaller or larger ROI surrounding a smaller or larger subject sitting further or closer to the camera; or alternatively, the image crop corresponding to ROI and fed to the downstream classifier can simply be expanded around a detection region or, if necessary, cropped to the required size before being provided to the downstream classifier.

It will be understood that where an image tensor is obtained from an event camera, an equivalent image to that shown in FIG. 2 will be produced, indeed such images tend to provide greater detail along edges where movement is occurring, and this can be especially beneficial for gesture recognition. The image tensor can be generated after a given number of events have occurred in the ROI 204 and if so, this means that image tensors will be provided at varying intervals, i.e. the time between image tensor t−1 and image tensor t will vary according to how much movement is occurring within the ROI. Thus, the interval will be short when rapid movement occurs, but longer in the absence of movement within the ROI; whereas as mentioned above, the frame rate from frame-based cameras tends to be generally constant.

Bearing in mind that it is the edges of moving objects which tend to be most indicative of a gesture being made, in some embodiments, rather than using an event camera, instead similar images are generated synthetically by subtracting a previous image acquired by a frame-based camera from a presently acquired image.

There are a number of ways to obtain such a difference image $X_{diff}$ directly from a stream of image frames:

1. Unsigned image difference: where the difference output result is in the same domain as both input image crops X(t) and X(t−1), which are unsigned int of a given bit depth.

$$X_{diff} = \frac{X(t-1) - X(t)}{2} + 2^{BitDepth-1}$$

2. Signed image difference: where the difference output result is in not the same domain as both input image crops, which is unsigned int of given bit depth. The resulting diff image would be signed.

$$X_{diff} = X(t-1) - X(t)$$

3. Unsigned image difference: with different temporal priority:

$$X_{diff} = \frac{X(t) - X(t-1)}{2} + 2^{BitDepth-1}$$

4. Signed image difference: with different temporal priority:

$$X_{diff} = X(t) - X(t-1)$$

where:
$2^{BitDepth-1}$ is an offset value depending on the bit depth of the input image stream (8 bit, 12 bit etc)
Unsigned image difference formulas require conversion from unsigned int to floating point for the correct division calculation.

The difference image $X_{diff}$ can then be normalized as follows:

$$X_{normalised} = \frac{X_{diff}}{2^{BitDepth}}$$

$X_{normalised}$ can then comprise either floating point values in the range [0, 1], if unsigned difference calculation is used; or [−1, 1] if signed difference calculation is used.

In any case, for the purposes of the present description, whether an image crop corresponding to ROI 204 is extracted: directly from an image frame; from a difference frame; or from an image tensor obtained from an event camera, a current image crop is referred to below as X(t) while a previous image crop is referred to as X(t−1).

Figure 3:
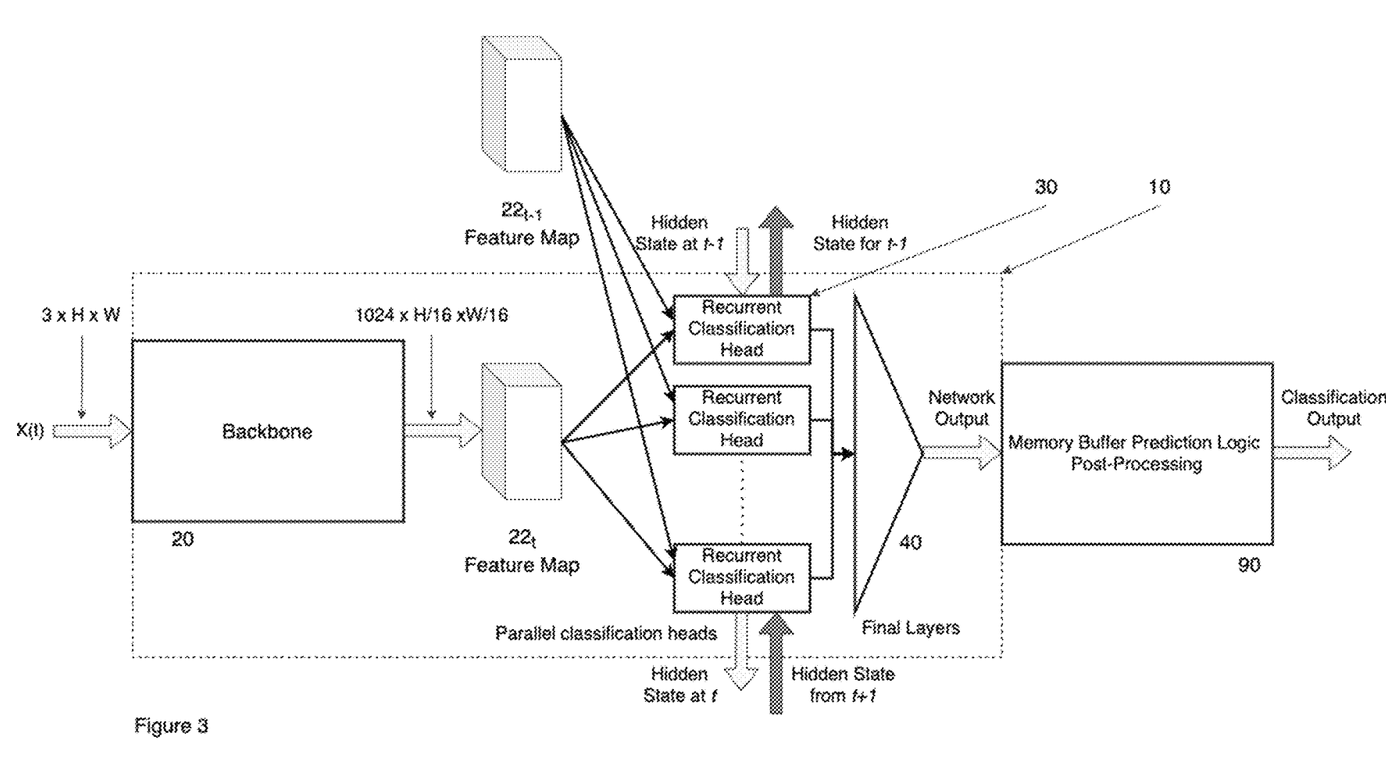
FIG. 3 is a schematic diagram of the major components of a network for identifying a gesture according to an embodiment of the present invention.

Referring now to FIG. 3, there is shown schematically a diagram of the major components of a network 10 for identifying a gesture according to an embodiment of the present invention. In the embodiment, each instance of the network 10 is fed with an image crop X(t) from an image of a scene as outlined above. As indicated above, in the embodiment, each image crop comprises a H=352 and W=352 pixel image or image tensor, however, it will be appreciated that this can vary and that is it is not necessary for the image crop to be square. In the embodiment, the image crop is shown as comprising 3 image planes corresponding to R, G, B.

In the embodiment, the first part of the network 10 comprises a multi-layer backbone 20; followed by multiple recurrent classification heads (RCH) 30; and a final stack of layers 40 that fuses features from all the upstream RCHs 30 and integrates the temporal features into one global class prediction comprising an indication of a gesture which a subject may be making at a given instant in time t.

The backbone 20 can either be an off the shelf pre-trained network or a bespoke custom designed backbone.

In one implementation, the backbone 20 comprises, 9 convolutional layers, each comprising a 2D convolution followed by an activation function, for example, PReLU and compressing a 3 channel colour input image of dimensions H×W into a deep feature map of dimensions H/16×W/16 with 1024 channels. So, for an input image crop of 352×352 pixels, the backbone will produce a 22×22 feature map. In other examples, an input image crop of 224×224 pixels produces a 14×14 feature map.

Examples of backbone which can be employed include EfficientNet B3/B2/B1/B0 disclosed in Mingxing Tan, Quoc V. Le, "EfficientNet: Rethinking Model Scaling for Convolutional Neural Networks", Proceedings of the 36 th International Conference on Machine Learning, Long Beach, California, PMLR 97, 2019.

In another embodiment rather than convolutional layers, a number of OctConv layers of the type described in Yunpeng Chen, Haoqi Fan, Bing Xu, Zhicheng Yan, Yannis Kalantidis, Marcus Rohrbach, Shuicheng Yan and Jiashi Feng, "Drop an Octave: Reducing Spatial Redundancy in Convolutional Neural Networks with Octave Convolution", 2019, https://arxiv.org/abs/1904.05049v3 can be employed.

The advantage of an OctConv based backbone 20 is that it offers slightly better accuracy (+1-2% on average) compared to a CNN based backbone for approximately the same computational cost while also slightly lowering memory overhead.

In either case, the purpose of the backbone 20 is to provide a feature map 22 for each time step from the input image crop X(t) for a frame.

Nonetheless, some implementation details which can be taken into account when implementing the backbone 20 are that use of pooling layers is not recommended, as they tend to blur spatial positions, which are important to the downstream RCHs 30.

As will be understood, the network 10 is concerned with being able to identify one of a number of different dynamic gestures which a user may be making at a given time. Some of these gestures may appear the same at a given instant, but the meaning of the gesture may be different in accordance with the direction in which the gesture is made over time, for example, a swipe left gesture may differ from a swipe right gesture. Other examples include rotate left and rotate right, where the user rotates their index finger in a circle motion towards their left or right respectively.

In the embodiment, all of the RCHs 30 have the same structure and are bi-directionally recurrent in that they provide/receive hidden layer information to/from both a previous instance of the network 10 and a subsequent instance of the network 10. This of course means that at least 3 instances of the network 10 will need to execute before the network 10 is fully running and if for example, each instance is fed with a difference image, then at least 4 images will need to be acquired before the network is fully running.

It will be appreciated that in variants of the illustrated embodiment, not all of the RCHs 30 need to have the same structure and be bidirectionally recurrent and in some case, some RCHs may only receive hidden layer information from either a previous instance of the network or a subsequent instance of the network. In other embodiments, further classification heads which are not recurrent can be added to the RCHs 30.

Also, while the number of RCH's 30 employed within the network is typically proportional to the number of gestures which are to be distinguished from one another, there does not need to be a one-to-one correspondence between the number of RCHs 30 and the number of gestures to be recognized.

Nonetheless, by employing one or more bidirectionally recurrent RCHs 30 analyzing the sequence of input image crops . . . X(t−1), X(t), X(t+1) . . . in both forward and backward directions at once, any instance of the network 10 can distinguish between gestures involving the same spatial appearance but with opposite direction of movement.

As indicated in FIG. 3, in the embodiment, the layers of the backbone 20 act as an encoder to compress the original input image into a deep feature map $22_t$ with a 1/16 scale of the input image. The RCHs 30 then increase the width of the network 10 depending on classification requirements.

In the embodiment, each instance of RCH 30 also receives as an auxiliary input the feature map $22_{t-1}$ produced by the previous instance of backbone 20 as well as the current feature map $22_t$. This is particularly useful when the input image map X(t) is a simple image crop as in the present case.

Figure 4:
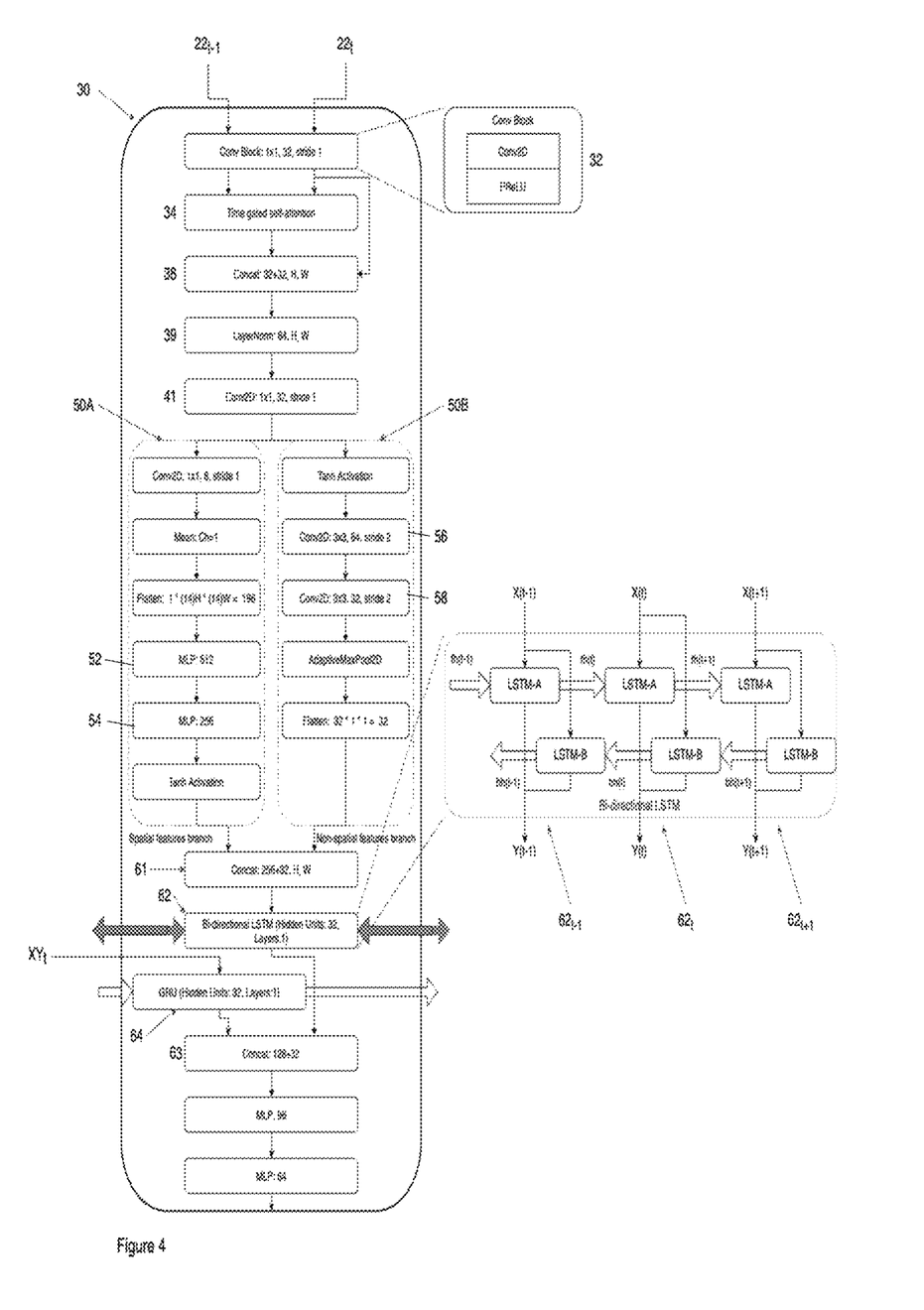
FIG. 4 illustrates in more detail a recurrent classification head (RCH) incorporated within the network of FIG. 3.

Referring now to FIG. 4, there is shown in more detail an exemplary network architecture for an instance of bidirectional RCH 30. Each feature map $22_{t-1}$, $22_t$ provided by the previous and current instance of backbone 20 is first passed through a convolution layer 32.

Figure 5:
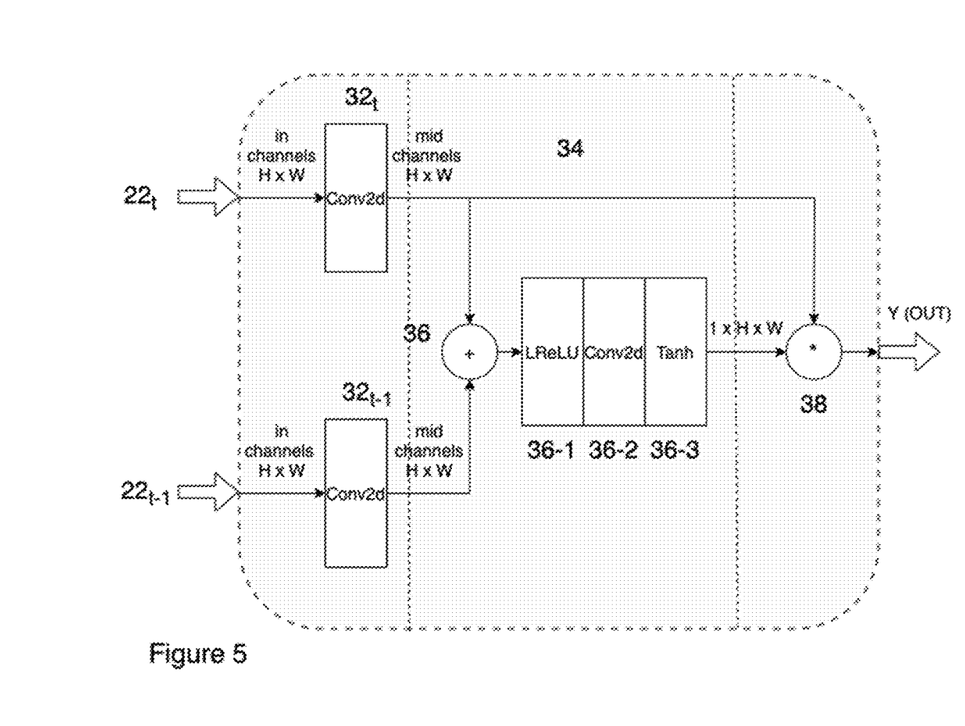
FIG. 5 shows a time-gated self-attention layer incorporated within the RCH of FIG. 4.
Figure 6:
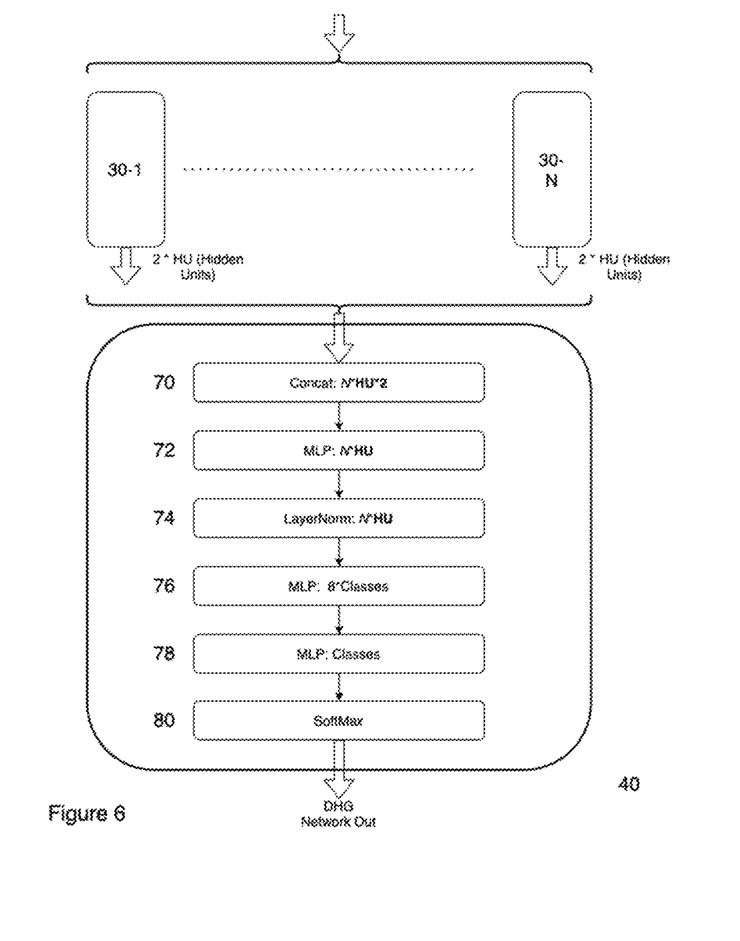
FIG. 6 illustrates in more detail, an exemplary set of final classification layers incorporated within the network of FIG. 3.

In the embodiment, especially where the input image crop has been extracted from a simple image frame, the next layer of the RCH comprises a gated spatial self-attention layer 34, shown in more detail in FIG. 5 and similar to that disclosed in Oktay, Ozan & Schlemper, Jo & Folgoc, Loic & Lee, Matthew & Heinrich, Mattias & Misawa, Kazunari & Mori, Kensaku & McDonagh, Steven & Hammerla, Nils & Kainz, Bernhard & Glocker, Ben & Rueckert, Daniel, "Attention U-Net: Learning Where to Look for the Pancreas", 2018. The layer 34 is time gated as the convoluted feature map $22_{t-1}$ produced by the previous instance of backbone 20 is combined in an adder 36 with the convoluted current feature map $22_t$. The sum is passed through an LReLu activation function 36-1, a further convolutional layer 36-2 and a tanh function 36-3 to effectively weight the difference between the two maps. This is in turn concatenated 38 with the original feature map $22_t$ to produce an output feature map Y having the same scale (in FIGS. 5, H=14 and W=14) as the feature maps $22_{t-1}$, $22_t$ (which in turn is 1/16 of the image crop X(t)).

Referring back to FIG. 4, in the embodiment, the self-attention layer 34, 38 is followed by a normalization layer 39 and a further convolution layer 41 before the network splits into 2 branches: a first 50A principally comprising two layers of fully connected nodes 52, 54 and which is sensitive to spatial features; and a second 50B principally comprising convolutional layers 56, 58 which are sensitive to non-spatial features.

The outputs of these branches are concatenated in a layer 61 before being output to a bidirectional long short-term memory, LSTM layer 62. Three instances of the layer $62_{t-1}$, $62_t$, and $62_{t+1}$ are shown in more detail in FIG. 4. Each instance comprises a first LSTM-A receiving a hidden layer input from a previous instance of LSTM-A and providing a hidden layer output to a next instance of LSTM-A; and a second LSTM-B providing a hidden layer output to a previous instance of LSTM-B and receiving a hidden layer input from a next instance of LSTM-B. Each LSTM-A and LSTM-B receives its input from the concatenation layer 61 and their outputs are in turn concatenated in layer 63. In an embodiment, the input/output of each LSTM layer 62 comprises 32 bytes.

Note that in the example, an LSTM layer is shown by way of example, by other forms of recurrent unit are also possible including a gated recurrent unit, GRU.

Although not limited to these examples, in the present application, there are two forms of RCH 30. In a first, the only inputs to the RCH 30 are the feature map(s) 22 and the hidden layer information from previous and successive instances of the LSTM 62. This can require a relatively high-resolution input image map X(t) extending over the portion of the field of view of the image acquisition device 104 where gestures are expected to appear, in the example, 352×352 pixels. This is referred to as a static network.

In a second dynamic variant, a hand detector (not shown) is applied to the ROI 204 with a view to identifying a location of at least one hand region 208, within the ROI 204, FIG. 4. In the embodiment, the X,Y location of one hand region at time T is fed to an instance of GRU 64. It will be appreciated that at any given time, two (or more) hands may be detected within the ROI 204. In an automotive environment, it is expected that valid gestures should only be made with one hand, as the other should be on the steering wheel. As such, the hand chosen by the hand detector should be the hand more likely to be making a gesture. Thus, it may be chosen as the hand disposed away from the steering wheel in the case of the driver or the hand which is generating more motion within the field of view of the image acquisition device 104. The X,Y location can be chosen as the center of the chosen hand region. It can also be useful to normalize the X,Y location of the hand within the ROI 204 rather than using direct pixel coordinates.

In other examples, where gesture may be made with two hands, for example by a passenger, then a pair of X,Y inputs can be provided to the layer 64 and if only one hand is detected, then null values can be used for the second pair.

In some instances, the implementation of the hand detector can involve additional computation, however, especially when the image acquisition device 104 is not an event camera, any failure of the hand detector to detect a hand within the ROI 204 may mean that the network 10 does not need to execute, so saving processing resources—this can be useful if for example a passenger were being monitored and they put their hands out of sight on their lap, as in the case of FIG. 4.

In any case, in embodiments of the present invention where a hand detector is employed, it has been found that the resolution of the input image crop X(t) can be reduced to 224×224 pixels which can result in a dramatic reduction in the computational requirement for the network 10.

In the embodiment of FIG. 4, the hand location is fed to a GRU layer 64 which also receives a hidden layer input from a previous instance of the RCH 30. This layer does not benefit from being bidirectionally recurrent in the same way as the layer 62, rather the previous instance can boost the performance of a current instance of the layer 64. As such, it will be appreciated that in other embodiments, the layer 64 does not need to be recurrent.

In the embodiment, where a hand detector is employed, the output of the GRU layer 64 can also be concatenated with the output of the LSTM 62 in layer 63. The output of that layer is then fed through a pair of fully connected layers 65,66 to produce a final classification for the instance of RCH 30 at time T. In the embodiment, each RCH 30 has one output that is twice the number of Hidden Units (HU) provided by the bidirectional LSTM layer 62. Therefore in the illustrated example where the LSTM layer 32 produces 32 hidden units, each RCH will have 64 values in its output.

As shown in FIG. 4, the final classification from each instance of RCH 30-1 ... 30-N within the network 10 is fed through a final set of classification layers 40 to produce a final gesture classification for the network at time T. In the embodiment, these layers comprise a concatenation layer 70, followed by fully connected (72), normalization (74) and further fully connected layers (76,78) before a final softmax function layer (80). The softmax layer 80 produces a vector including a normalised prediction for each class of gesture to be detected by the network 10.

In a simple embodiment, the highest valued element of the network, especially if the value is over a given threshold, for example, 0.8 in a range of 0 to 1, can be taken as a detected gesture.

On the other hand, as will be appreciated, the final determination of the gesture being employed by a user at any given time T need not be limited to the output of the instance of network 10 at time T and results from previous instances of the network 10 can be stored and analyzed in post processing circuitry 90, FIG. 3, to confirm or adjust a given classification.

Exemplary post-processing circuitry 90 is described below. In a first step, the post processing circuitry 90 tests the vector produced by a current instance of the network 10 against a threshold value between 0.8 and 0.95 (in a range from 0 to 1). If none of the elements of the vector comprise a value above the threshold, then the output of the network is set to 0.0 for each of the classes. Thus, if at least one of the class predictions is above the threshold, the output of the network will be unchanged and passed downstream to a first level L1 buffer.

The L1 buffer keeps between 40 and 60 network class vector predictions from successive instances of the network 10 and the post-processing circuitry 90 evaluates the buffer contents every 20 to 30 timesteps (instances of the network 10) respectively—this is referred to as a time evaluation window. At each time evaluation window, the post-processing circuitry 90:

1. Sums up all the class values over the time evaluation window, thereby obtaining a class prediction vector over the entire evaluation window.

2. Determines the greatest summed class value to predict a winning class over the 20-30 frames evaluation window. After evaluation, the entire buffer is attenuated by 0.6-0.7 so that on the next evaluation, the values from the oldest instances of the network 10 will be less important for the predicted class.

In one implementation, a level 2 buffer holds only 3 values which are the last winning classes from the previous 3 time evaluation windows. This buffer is processed by memory compensation logic which can for example, cancel correct evaluations when a return gesture is recognized as having been made. So, for example, if a user is recognized as having made a swipe right command over one evaluation window and then a swipe left command over the next evaluation window, these can be treated as cancelling one another.

The network architecture 10 can be trained either with standard video inputs from RGB, NIR and RGB-IR sensors, or synthetic time event inputs derived from standard sensor video inputs via pre-processing.

Note that while any given instance of the network 10 only has direct access to inputs from a previous and successive instance as well as possibly a previous image crop, gestures which are to be recognized may extend across a greater number of frames, for example, frame sequences of length 10 or larger.

The network 10 can also be trained and used by skipping frames. However, this would require longer sequences for training. This type of frame skipping is called dilation and can be used to adapt the network 10 to faster frame rate input sources or reduce computation complexity by running the network 10 every n frames and skipping the rest.

The invention claimed is:

1. A method for identifying a gesture from one of a plurality of dynamic gestures, each dynamic gesture comprising a distinct movement made by a user over a period of time within a field of view of an image acquisition device, said method comprising:

iteratively acquiring a current sequence of images during a period of time while the user is making one of the plurality of dynamic gestures from an infra-red image source or a visible wavelength image source at a given time in a vehicle cabin, wherein one of the infra-red image source or the visible wavelength image source is selected based on a measured ambient light level of the vehicle cabin; and passing at least the current sequence of said images through a current instance of a bidirectionally recurrent multi-layer classifier, wherein the bidirectionally recurrent multi-layer classifier analyzes the current sequence of said images in both forward and backward directions at once to distinguish between gestures involving a same spatial appearance but with opposite direction of movement, at least one layer of said bidirectionally recurrent multi-layer classifier being configured to:

receive a hidden layer output from a first corresponding intermediate layer of a previous instance of said bidirectionally recurrent multi-layer classifier;

provide a hidden layer output to said first corresponding intermediate layer of a successive instance of said bidirectionally recurrent multi-layer classifier;

provide a hidden layer output to a second corresponding intermediate layer of said previous instance of said bidirectionally recurrent multi-layer classifier; and receive a hidden layer output from said second corresponding intermediate layer of said successive instance of said bidirectionally recurrent multi-layer classifier; and a final layer of said bidirectionally recurrent multi-layer classifier comprising an output indicating a probability that a gesture from said plurality of dynamic gestures is being made by a user during the time of acquiring said image.

2. A method according to claim 1 wherein said gesture comprises one of: a hand gesture; a head gesture; or a body gesture.

3. A method according to claim 1 further comprising subtracting a previously acquired image from said current image to provide a difference image before passing at least a portion of said difference image through said current instance of said bidirectionally recurrent multi-layer classifier.

4. A method according to claim 1 wherein said image acquisition device comprises an event camera and wherein acquiring said current image comprises accumulating event information obtained from said event camera to form said image.

5. A method according to claim 1 wherein said portion of said current image comprises a fixed size image crop from a location within said field of view of an image in which it is expected that a user will make said gesture.

6. A method according to claim 2 in which said gesture comprises one of a hand or a head gesture, and wherein the method further comprises detecting a location of the hand or head within the field of view of the image acquisition device and providing the location to a third intermediate layer of said classifier.

7. A method according to claim 6 in which said third intermediate layer is configured to receive an output from a corresponding third intermediate layer of said previous instance of said network and provide an output to a corresponding third intermediate layer of said successive instance of said network.

8. A method according to claim 1 wherein said classifier comprises: a first plurality of layers configured to compress said portion of said current image into a low spatial resolution feature map; and a second plurality of layers including said first and second intermediate layers.

9. A method according to claim 1 comprising providing a feature map produced by said first plurality of layers of said previous instance of said classifier as an additional input to said second plurality of layers.

10. A method according to claim 9 comprising subtracting said feature map produced by said first plurality of layers of said previous instance of said classifier from said feature map produced by said first plurality of layers of said current instance of said classifier.

11. A method according to claim 1 wherein said classifier comprises a plurality of classification heads, each instance of classification head being configured to produce a respective classification and at least one of said classification heads including a respective instance of said first and second intermediate layers.

12. A method according to claim 11 wherein each of said classification heads comprises a first branch of layers including one or more fully connected layers configured to detect spatial features within said portion of said current image; and a parallel second branch of layers including one of more convolutional layers configured to detect non-spatial features within said portion of said current image.

13. A method according to claim 12 further comprising concatenating an output from each of said first and second branches of layers before said first and second intermediate layers.

14. A method according to claim 1 operable in a vehicle and, responsive to receiving an indication that a gesture from said plurality of dynamic gestures is being made by a user during the time of acquiring said image with a probability greater than a given threshold, controlling a function of said vehicle in accordance with said gesture.

15. A method according to claim 5 comprising adjusting a location of said fixed size image crop in accordance with change in location of said user within the field of view of said image acquisition device.

16. A method according to claim 1 and wherein said final layer of said bidirectionally recurrent multi-layer classifier comprises a respective output indicating a probability that each gesture from said plurality of dynamic gestures is being made by a user during the time of acquiring said image.

17. A method according to claim 16 further comprising normalizing said outputs.

18. A method according to claim 16 further comprising combining outputs from one or more previous instances of said classifier with said outputs from said current instance of said classifier before making a final inference of the gesture being made by said user during the time of acquiring said image.

19. A computer program product comprising a computer readable medium on which executable instructed are stored, which when executed on a computing device are configured to perform the steps of claim 1.

20. A gesture recognition system comprising an image acquisition device operably connected to a processor, a memory and storage storing executable instructions which when executed by said processor are configured to perform the steps of claim 1.

* * * * *